Patented Aug. 10, 1943

2,326,270

UNITED STATES PATENT OFFICE 2,326,270

CHEMICAL COMPOUND AND PROCESS

James Herbert Werntz, Brandywine Hundred, Del., assignor to E. I. du Pont de Nemours & Company, Wilmington, Del., a corporation of Delaware No Drawing. Application May 27, 1939, Serial No. 276,048

2 Claims. (Cl. 260—459)

This invention relates to new chemical compounds, their methods of production, and their technical uses, and more particularly to the manufacture and utilization of secondary straight chain alkyl sulfates, containing from 13 to 23 carbon atoms, which have the general formula:

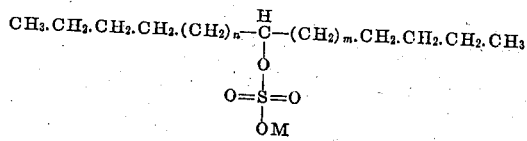

wherein $n$ and $m$ stand for integers the sum of the values of which is not less than 4 nor more than 14 and M stands for a cation such as a hydrogen ion, a metallic ion, an ammonium ion, or a substituted ammonium ion.

This invention has as an object the preparation of a number of new chemical compounds which have surface active properties. A further object is to manufacture these new chemical compounds by novel and easily conducted processes which give high yields of relatively high quality products. A still further object is to apply these new compounds in various connections wherein surface active compounds are commonly employed. Other objects will appear hereinafter.

These objects are accomplished by the following invention which relates to the production of new secondary straight chain alkyl sulfates containing from 13 to 23 carbon atoms by sulfating a straight chain secondary saturated aliphatic alcohol, containing from 13 to 23 carbon atoms, which has the general formula:

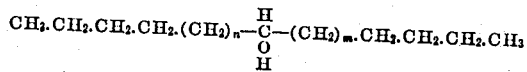

wherein $n$ and $m$ represent integers the sum of the values of which is not less than 4 nor more than 14.

The following examples will serve to illustrate how the invention may be practiced.

Example 1

*Sodium tridecyl-7 sulfate.*—20 grams of tridecanol-7 was dissolved in 100 cubic centimeters of anhydrous ethyl ether and sulfated by adding slowly with stirring a solution of 13 grams of chlorosulfonic acid in 10 cubic centimeters of ethyl ether. The temperature was maintained at 0 to 5° C. The sulfation mass was then stirred at 0 to 5° C. about 15 minutes longer and neutralized by pouring it slowly into a dilute aqueous solution of sodium hydroxide. The solution of the neutralized product, which is sodium tridecyl-7 sulfate, was evaporated to dryness. The active ingredient was extracted from the dried material with hot methyl alcohol. The methyl alcohol solution was diluted with water and extracted with petroleum ether in order to remove unsulfated tridecanol-7. The extracted solution was then evaporated to dryness. A white waxy solid which was soluble in water was thus obtained. Water solutions of this product foamed readily.

Example 2

*Sodium heptadecyl-9 sulfate.*—20 grams of heptadecanol-9 was dissolved in 100 cubic centimeters of anhydrous ethyl ether and treated with 10 grams of chlorosulfonic acid dissolved in 10 cubic centimeters of ethyl ether. The product was neutralized and worked up as in Example 1. A waxy white solid soluble in water to give a foaming solution was obtained.

Example 3

*Sodium tricosyl-12 sulfate.*—15 grams of diundecyl carbinol was dissolved in 150 cubic centimeters of ethyl ether and sulfated with a solution of 8 grams of chlorosulfonic acid in 12 cubic centimeters of ethyl ether. The product was neutralized with an aqueous solution of sodium hydroxide, and the ether evaporated from the solution. A white waxy solid separated out of the aqueous solution. This was purified by dissolving it in acetone, filtering and evaporating the acetone. The purified product was soluble in water.

Example 4

*Sodium nonadecyl-10 sulfate.*—30 grams of dinonyl carbinol was dissolved in 200 cubic centimeters of anhydrous ethyl ether and treated with 15 grams of chlorosulfonic acid dissolved in 15 cubic centimeters of ethyl ether. The product was worker up as in Example 3.

Example 5

*Sodium pentadecyl-8 sulfate.*—15 grams of pentadecanol-8 was dissolved in 100 cubic centimeters of anhydrous ethyl ether, and a solution of 6.9 grams of chlorosulfonic acid dissolved in 10 cubic centimeters of ethyl ether was added thereto over a period of 15 minutes, during which time the temperature was held at 0° C. and the reaction mixture was stirred. The reaction mixture was stirred one-half hour longer after all the acid had been added, and it was then poured into 200 grams of ice and neutralized with 10% aqueous sodium hydroxide solution using phenolphthalein as the indicator. The ether layer was separated from the aqueous layer and was extracted with 230 grams of a mixture of equal parts by weight of methanol and water. The ether layer was evaporated and gave a residue of 3.6 grams of unsulfated alcohol. The methanol-water solution was combined with the original water solution and heated on a steam bath to drive off the methanol. The water solution of sodium pentadecyl-8 sulfate was clear and foamed readily. An aqueous solution of the sodium sulfate of pentadecanol-8 wet cotton linters in 25 seconds at a concentration of 0.31 grams per liter when tested by the method of Draves and Clarkson (American Dyestuffs Reporter 20, 201, 1931).

Of the surface active agents disclosed herein I have found that maximum wetting efficiency is displayed by the secondary alkyl sulfates which contain from 13 to 17 carbon atoms in a straight chain. I have discovered that if the sulfate group is near the middle of the secondary straight chain alkyl group the products are more efficient wetting agents than those in which the sulfate group is at or near the end of the alkyl group. In general, the sulfates in which the carbon atoms are in a straight chain have greater capillary activity than the sulfates of the same molecular weight in which the carbon atoms are in a branched chain.

In the preparation of the secondary straight chain alkyl sulfates of the present invention I may employ any straight chain secondary saturated aliphatic alcohol containing from 13 to 23 carbon atoms which has the general formula

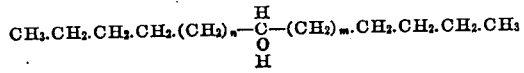

wherein $n$ and $m$ represent integers the sum of the values of which is not less than 4 nor more than 14. These alcohols may be obtained from any desired source. For example, these alcohols may be made by the catalytic hydrogenation of ketones by such a process as that which is described and claimed in the U. S. patent to McCall No. 2,108,133. If these alcohols are prepared by reducing ketones, it is convenient to make the intermediate ketones, which are to be reduced, by the ketonization of aliphatic monocarboxylic acids which contain from 7 to 12 carbon atoms. The conversion of such acids to ketones may be accomplished in any desired manner. For instance, these acids may be converted into ketones by the catalytic decarboxylation process which is described and claimed in the U. S. patent to Wortz No. 2,108,156.

The capillary active products of this invention are preferably obtained by treating a straight chain secondary saturated aliphatic alcohol with a sulfating agent such as sulfuric acid or chlorosulfonic acid. In carrying out the sulfation of the alcohol, it is preferred to operate in a suitable organic solvent, such as pyridine, ethyl acetate, propyl acetate, diethyl ether, carbon tetrachloride, trichloroethylene, etc., and at temperatures of $-30°$ C. to $50°$ C., although lower and higher temperatures may be used. The preferred solvents are ethyl acetate, propyl acetate, ethyl ether, and pyridine. When ethyl acetate, propyl acetate, or ethyl ether is employed as the solvent, it is advisable to maintain a temperature of about $0°$ C. to $-30°$ C. during the sulfation process. When pyridine is used as a solvent, the sulfation reaction is usually carried out at temperatures between 40 and $45°$ C. I prefer to use chlorosulfonic acid for sulfating straight chain secondary saturated aliphatic alcohols.

The sulfated straight chain secondary saturated aliphatic alcohols may be used as such, but generally they are converted to their alkali metal salts by neutralization with an alkali metal hydroxide, such as sodium hydroxide. The potassium, ammonium, calcium, and magnesium salts may also be prepared and used. Suitable salts of these secondary straight chain alkyl sulfates may also be made from such amines as dimethyl amine, ethyl amine, triethanol amine, butyl amine, glucamine, methyl glucamine, pyridine, piperidine, cyclohexyl amine, aniline, toluidine, etc. When in this application I mention a straight chain secondary alkyl sulfate, I intend to refer generically to the sulfate irrespective of how or whether the acid hydrogen of the sulfate group may have been neutralized.

By comparative tests it has been found that sodium heptadecyl-9 sulfate and sodium pentadecyl-8 sulfate are better wetting agents than sodium isopropyl naphthalene sulfonate, sodium dodecyl sulfate, and the sodium salt of the sulfuric acid ester of 5-ethyl nonanol-2. These comparative tests were conducted by the method of Draves and Clarkson, which is described in American Dyestuffs Reporter 20, 201 (1931).

The new compositions covered in this case belong to the class of surface active or capillary active materials in that they have colloidal properties and may, therefore, be advantageously used in any process involving wetting, penetrating, deterging, dispersing, emulsifying, frothing, foaming, and kindred phenomena. These compositions may be employed in pure or standardized form, and, if desired, in conjunction with known processing or treating agents. They may be used by themselves or in combination with other surface active agents in any relation in which surface active agents having colloidal properties have heretofore been used.

The above description and examples are intended to be illustrative only and not to limit the scope of the invention. Any departure therefrom which conforms to the spirit of the invention is intended to be included within the scope of the appended claims.

I claim:

1. A process of preparing an alkali metal salt of the sulfuric acid ester of heptadecanol-9 which comprises reacting heptadecanol-9 with chlorsulfonic acid in an anhydrous organic solvent and neutralizing the sulfated heptadecanol-9 with an aqueous solution of an alkali metal hydroxide.

2. An alkali metal heptadecyl-9 sulfate.

JAMES HERBERT WERNTZ.